US011340610B2

(12) United States Patent
Yu et al.

(10) Patent No.: US 11,340,610 B2
(45) Date of Patent: May 24, 2022

(54) AUTONOMOUS TARGET FOLLOWING METHOD AND DEVICE

(71) Applicants: Huili Yu, Fremont, CA (US); Yanling Yang, Fremont, CA (US)

(72) Inventors: Huili Yu, Fremont, CA (US); Yanling Yang, Fremont, CA (US)

(*) Notice: Subject to any disclaimer, the term of this patent is extended or adjusted under 35 U.S.C. 154(b) by 387 days.

(21) Appl. No.: 16/517,591

(22) Filed: Jul. 20, 2019

(65) Prior Publication Data
US 2020/0033857 A1    Jan. 30, 2020

Related U.S. Application Data

(60) Provisional application No. 62/702,901, filed on Jul. 24, 2018.

(51) Int. Cl.
| *G06V 20/10* | (2022.01) |
| *H04W 4/38* | (2018.01) |
| *G01S 17/42* | (2006.01) |
| *G05D 1/00* | (2006.01) |
| *H04W 4/029* | (2018.01) |
| *G06N 20/00* | (2019.01) |
| *G05D 1/02* | (2020.01) |

(52) U.S. Cl.
CPC ......... *G05D 1/0088* (2013.01); *G05D 1/0212* (2013.01); *G06N 20/00* (2019.01); *H04W 4/029* (2018.02); *H04W 4/38* (2018.02)

(58) Field of Classification Search
CPC ..... G05D 1/0088; G05D 1/0212; H04W 4/38; H04W 4/029; G06N 20/00
See application file for complete search history.

(56) References Cited

U.S. PATENT DOCUMENTS 10,671,076 B1* 6/2020 Kobilarov ............ G05D 1/0255
2018/0257660 A1* 9/2018 Ibrahim ................ H04L 67/12

\* cited by examiner

*Primary Examiner* — Mathew Franklin Gordon

(57) ABSTRACT

Systems and methods are provided for autonomous target following. An exemplary method may comprise: receiving environmental measurements collected by one or more sensors equipped on a robotic device; clustering the environmental measurements into a plurality of segments; and determining a location of a target based on the plurality of segments.

17 Claims, 11 Drawing Sheets

AUTONOMOUS TARGET FOLLOWING METHOD AND DEVICE

CROSS REFERENCE TO RELATED APPLICATION

This application claims the benefit of priority to U.S. Provisional Application No. 62/702,901, filed with the United States Patent and Trademark Office on Jul. 24, 2018, and entitled "AUTONOMOUS TARGET FOLLOWING METHOD AND DEVICE," which is hereby incorporated by reference in its entirety.

TECHNICAL FIELD

This disclosure generally relates to robotics, and in particular, to autonomous target following method and device.

BACKGROUND

Existing object or target follower techniques first localize the target using sensor information, and then control a robot to follow the target based on the target's location in the coordinate frame of the robot. Thus, accurate location information of the target is critical for the robot to continuously track the target without loss. Some of existing localization methods based on Bluetooth, Wifi, and Zigbee, etc., do not produce high accuracy and reliability of the location information of the target. Other methods that use Ultra-Wide Band (UWB) technology to determine the location of the target relative to the robot may provide a higher accuracy. However, these kind of methods require a special peripheral device attached to the target, like a wristband or watch, necessary for UWB communication between the target and the robot. In addition, the UWB-only localization methods still do not provide a high enough performance in terms of reliability and accuracy.

Some work attempts to rely on computer vision and machine learning techniques, e.g., object detection and recognition, face or human detection and recognition, etc., to determine target of interest in a camera image plane. However, this type of method requires a huge amount of computational resources.

Further, no existing methods provide a solution for target following in a crowded and cluttered environment, such as at airports, in shopping malls, etc., where the target may have to make turns frequently. When the target makes turns, it may move out of field of view (FOV) of sensors (camera, lidar, etc.). Without taking into account the frequent turning scenarios, the robot may lose the desired target and/or be attracted by other objects.

SUMMARY

Various embodiments of the present disclosure can include systems, methods, and non-transitory computer readable media for autonomous target following. According to one aspect, an autonomous target following method may comprise: receiving environmental measurements collected by one or more sensors equipped on a robotic device; clustering the environmental measurements into a plurality of segments; and determining a location of a target based on the plurality of segments.

In some embodiments, one or more of the plurality of segments correspond to a part of the target or the entire target. In some embodiments, determining a location of a target based on the plurality of segments comprises: extracting one or more features of each of the plurality of segments; and filtering the plurality of segments based on the one or more features of each of the plurality of segments to determine the location of the target.

In some embodiments, the one or more features of the each of the one or more segments include one or more of a length, a width, convex property, a mean curvature and the radius of a curve included in the one or more segments.

In some embodiments, the method may further comprise: capturing one or more initial segments corresponding to a part of the target or the entire target at an initial time instance; and obtaining one or more target's features based on the one or more initial segments corresponding to the part of the target or the entire target at the initial time instance.

In some embodiments, the method may further comprise: obtaining an initial location of the target based on the one or more initial segments corresponding to the part of the target or the entire target at the initial time instance.

In some embodiments, determining a location of a target based on the plurality of segments comprises: selecting one or more candidate segments from the plurality of segments by comparing the extracted features of the plurality of segments with the one or more target's features obtained at the initial time instance.

In some embodiments, the method may further comprise: obtaining a region of interest about the location of the target by using a RF-based method; and selecting the one or more candidate segments from the plurality of segments based on the region of interest.

In some embodiments, determining a location of a target based on the plurality of segments comprises: generating a predicted location of the target at a current time instant based on one or more historical locations of the target at one or more previous time instances; and filtering out one or more segments incompatible with the predicted location of the target from the plurality of segments to determine the location of the target at the current time instance.

In some embodiments, generating a predicted location of the target at a current time instant comprises: fitting the one or more historical locations of the target into a polynomial to generate the predicted location.

In some embodiments, generating a predicted location of the target at a current time instant comprises: generating the predicted location of the target based on an estimated polynomial; selecting one or more segments compatible with the predicted location of the target from the plurality of segments; and updating one or more parameters of the polynomial based on a location determined by the one or more selected segments and historical locations of the target.

In some embodiments, the robotic device is moving in front of or in side front of the target, and the method further comprises: predicting a future location of the target at a future time instance based on the location of the target at a current time instance and one or more historical locations of the target at one or more previous time instances.

In some embodiments, the method may further comprise: determining whether the future location of the target is accessible; in response to determining that the future location of the target is not accessible, analyze an intent of the target to adjust the future location of the target; and in response to determining that the future location of the target is accessible, drive the robotic device to a location with a desired range and azimuth to the future location of the target.

In some embodiments, filtering the plurality of segments based on the one or more features of each of the plurality of segments to determine the location of the target comprises: generating a machine learning model for detecting a part of the target or the entire target based on the one or more features of each of the plurality of segments; and training the machine learning model by using training data which comprises a plurality of segments collected offline.

In some embodiments, determining a location of a target based on the plurality of segments comprises: generating a predicted location of the target by using Kalman filter based on a predetermined motion model of the target; selecting one or more segments consistent with the predicted location from the plurality of segments; and determining the location of the target based on the one or more selected segments.

In some embodiments, the method may further comprise: storing a plurality of historical locations of the robotic device; forming a path based on the plurality of historical locations; determining one or more turning points on the path based on one or more changes of directions; generating a graph by using the one or more turning points, an initial location and a goal location as nodes; and determining an optimal route between the initial location and goal location.

According to another aspect, an autonomous target following system may comprise a processor and a non-transitory computer-readable storage medium storing instructions that, when executed by the processor, cause the system to perform a method for autonomous target following. The method may comprise: receiving environmental measurements collected by one or more sensors equipped on a robotic device; clustering the environmental measurements into a plurality of segments; and determining a location of a target based on the plurality of segments.

According to yet another aspect, a robotic device may comprise one or more sensors equipped on the robotic device; and a computing device. The computing device may comprise: a processor and a non-transitory computer-readable storage medium. The non-transitory computer-readable storage medium may comprise instructions that, when executed by the processor, cause the processor to perform a method for autonomous target following. The method may comprise: receiving environmental measurements collected by one or more sensors equipped on a robotic device; clustering the environmental measurements into a plurality of segments; and determining a location of a target based on the plurality of segments.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Figure 1:
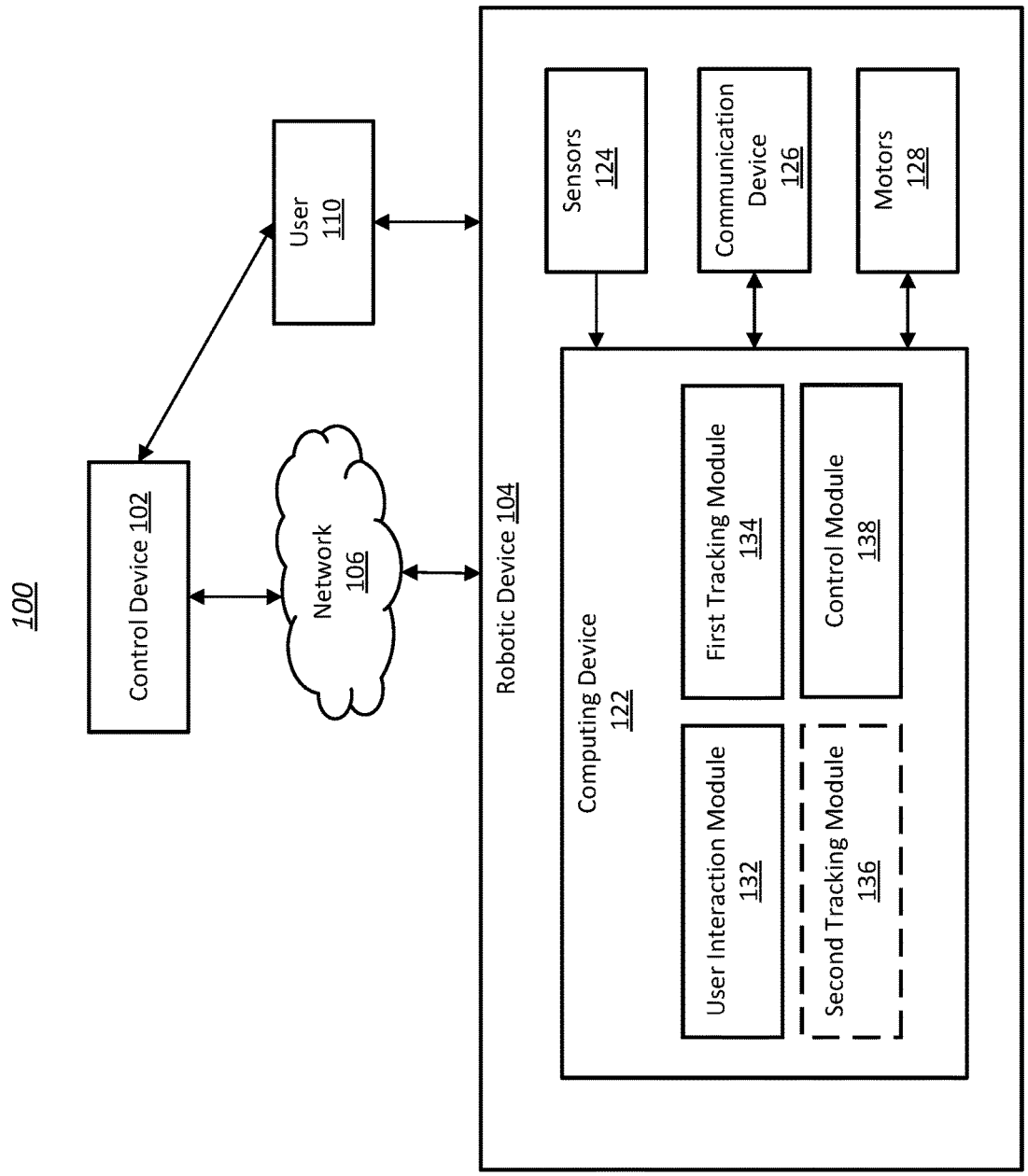
FIG. 1 illustrates an exemplary environment for autonomous target following, in accordance with various embodiments.

FIG. 1 illustrates an exemplary environment 100 for autonomous target following, consistent with exemplary embodiments of the present disclosure. As shown in FIG. 1, the exemplary environment 100 may include a control device 102 and a robotic device 104, which may be connected with each other through one or more networks, e.g., a network 106. The control device 102 and the robotic device 104 may communicate over the network 106 using one or more communication protocols, for example, cellular, Bluetooth, WiFi, Ultra-wideband (UWB), Zigbee, Radio-frequency Identification (RFID) communication protocols and other communication protocols. The control device 102 may be a mobile phone, a personal computer, a wearable device, a tablet, a joystick, etc. The control device 102 may be configured to allow a user 110 to communicate/interact with the robotic device 104 through the network 106. In some embodiments, the user 110 may control the motion of the robotic device 104 over a cellular phone. In some embodiments, the user 110 may also obtain status information of the robotic device 104 through the control device 102. For example, the status information of the robotic device 104 may describe an operation mode, a current location, and/or other status of the robotic device 104. In some embodiment, the robotic device 104 may be directly controlled or interacted with by the user 110. For example, the user 110 may manually control the robotic device 104 through a control panel or control button on the robotic device 104. In another example, the robotic device 104 may receive commands from the user 110 by monitoring and capturing the user's 110 actions such as hand gestures. On the other hand, the robotic device 104 may send warning signals to the user 110, such as voice or vibration signals, to warn the user 110 of failure of following.

In some embodiments, the robotic device 104 may include a computing device 122, sensors 124, a communication device 126, and motors 128. The computing device 122 may be connected with the other components of the robotic device 104, e.g., the sensors 124, the communication device 126, and the motors 128, to retrieve sensor measurements about the environment and user commands from the user 110 via the communication device 126 over the network 106, and to generate and transmit control commands to the motors 128. The computing device 122 may include one or more processors and memory (e.g., permanent memory, temporary memory). The processor(s) may be configured to perform various operations by executing machine-readable instructions stored in the memory. The computing device 122 may include other computing resources and/or have access (e.g., via one or more connections/networks) to other computing resources. The computing device 122 may be a single board computer, an embedded computing device including one or more central processing units (CPUs) or one or more graphics processing units (GPUs), a personal computer, a field-programmable gate array (FPGA) based computing device, etc.

While the computing device 122 is shown in FIG. 1 as a single entity, this is merely for ease of reference and is not meant to be limiting. In some embodiments, one or more components/functionalities of the computing device 122 described herein may be implemented in multiple computing devices.

The sensors 124 may include the sensors that measure the internal states of the autonomous following robotic device 104, e.g., a position, a velocity, and an acceleration, etc. In some embodiments, this type of sensors 124 may include a Global Positioning System (GPS) and an Inertial Navigation System (INS) to determine the current geolocation of the robotic device 104. The sensors 124 may also include the sensors used to measure the surrounding environment of the robotic device 104. For example, this type of sensors may include one or more two dimensional (2D) laser scanners, three dimensional (3D) laser scanners, RGB-D cameras, monocular cameras, stereo cameras, ultrasonic sensors, infrared distance sensors, radars, etc. These sensors may be used to obtain the environmental information such as a distance to an object (e.g., the user 110), azimuth and elevation angles to an object, linear and angular velocity of an object, etc.

The communication device 126 may include a Network Interface Card, a WiFi wireless network adapter, a Bluetooth device, etc., which allow the computing device 122 to receive commands from and send responses to the control device 102 through the network 106. For example, the computing device 122 may receive a command for stopping the robotic device 104 from the control device 102 operated by the user 110. In another example, the computing device 112 may send a vibration signal indicating a loss of track of a target (e.g., a user 110) to the control device 102 so that the user 110 may be notified that the robotic device 104 has lost the track of the user 110. In some embodiments, the communication device 126 may also include several Bluetooth beacons which communicate with a Bluetooth device equipped with the control device 102, e.g. a cell phone, to determine the location of the target (e.g., the user 110 using the control device 102). In some embodiments, the communication device 126 may include a RFID reader which communicates with RFID tags attached on the target, to determine the location of the target. In some embodiments, the communication device 126 may include a UWB base, which is used to communicate with UWB tags attached on the target (e.g., worn by the user 110), to determine the location of the target.

The motors 128 are connected to the computing device 126 to receive the control commands that drive the robotic device 104 to move (e.g., follow a target such as the user 110). For example, the motors 128 may be servo motors, step motors, brushless DC motors, brushed DC motors, geared DC motors, etc. In some embodiments, the motors 128 may include encoders that provide odometry information to the computing device 126, which may be used to calculate the robotic device's 104 location. In some embodiments, the odometry information may include rotational speeds of the motors. In some embodiments, the odometry information may include linear and angular velocity of the robotic device 104. In some embodiments, the odometry information may be encoder ticks of the motors.

The computing device 122 may include a user interaction module 132, a first tracking module 134, and a control module 138, and optionally a second tracking module 136. In some embodiments, the user interaction module 132 may be communicatively connected to the control module 138. In some embodiments, the user interaction module 132 may receive inputs from the user 110 through the communication device 126 and/or the network 106, and respond to the user 110 based on the inputs. In some embodiments, the user interaction module 132 may receive the control commands from the user 110 through the control device 102 and relay the control commands to the control module 138. For example, the user interaction module 132 may receive commands for stopping, moving, or turning the robotic device 104 from the user's 110 control device 102 such as a cell phone, a wearable device, a tablet, a joystick, etc., and transmit the commands to the control module 138 for executing the commands. In some embodiments, the user interaction module 132 may receive data (e.g., video data, picture data, etc.) from the sensors 124 (e.g., a camera) that captures user gestures indicating stopping, moving, or turning the robotic device 104. After recognizing these commands indicated by the user gestures, the user interaction module 132 may send the commands to the control module 138. In some embodiments, the user interaction module 132 may enable the user 110 to switch between an autonomous mode and a manual mode. The user interaction module 132 may also send responses to the control device 102 or to the user directly, e.g., displaying the status information of the robotic device 104, sending a warning signal to indicate that the robotic device 104 has lost track of the target (e.g., the user 110), etc.

The first tracking module 134 may receive sensor measurements obtained from the sensors 124, determine a location of the target (e.g., the user 110) and provide the determined location of the target to the control module 138. In some embodiments, the first tracking module 134 is communicatively connected to the second tracking module 136 to fuse the target location determined by the first tracking module 134 with the target location determined by the second tracking module 136 using the Radio Frequency (RF) based methods, such as Bluetooth, UWB, or RFID technologies. The first tracking module 134 will be described in detail below with reference to FIG. 2.

Figure 2:
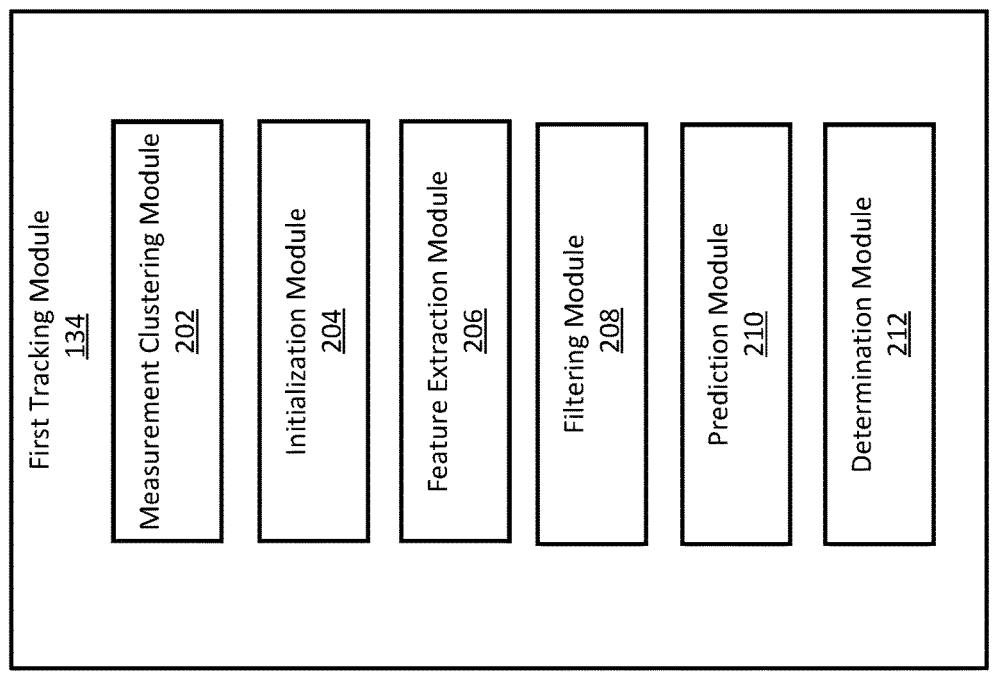
FIG. 2 illustrates an exemplary tracking module for tracking a moving target's locations, in accordance with various embodiments.

FIG. 2 illustrates the general diagram 200 representing the components of the first tracking module 134. In the illustrated embodiments of FIG. 2, the first tracking module 134 includes a measurement clustering module 202, an initialization module 204, a feature extraction module 206, a filtering module 208, a prediction module 210, and a determination module 212. In some embodiments, the measurement clustering module 202 processes the environmental measurements obtained from the sensors 124 and clusters the obtained measurements into segments. For example, a 2D laser scanner or a 3D laser scanner may be used to scan the target and generate 2D or 3D laser scan data of the target. For example, the scan data may include scan points each associated with distance information and direction information (e.g., azimuth). The measurement clustering module 202 may obtain the 2D or 3D laser scan data from the 2D or 3D laser scanner 124. The measurement clustering module 202 may divide the scan data into one or more segments based on distance discontinuity of the scan points using connected component based methods. For example, scan points with continuous distances may cluster into one segment.

In some embodiments, a monocular camera 124 may be used to generate a color image about the environment. The measurement clustering module 202 may receive the color image from the monocular camera 124 and divide image pixels in the color image into segments based on features of the color image, e.g., color and texture, etc. In some embodiments, a RGB-D or stereo camera 124 may be used to generate a RGB color image and a depth image about the environment. The measurement clustering module 202 may cluster the image pixels into segments based on features of the color image, such as color and texture, etc., and/or distance discontinuity of the depth image. In some embodiments, The measurement clustering module 202 may use machine learning and deep learning algorithms to generate segments from the sensor measurements and detect objects.

The initialization module 204 may receive the segments from the measurement clustering module 202. The initialization module 204 may determine one or more target features and an initial location of the target (e.g., the user 110) based on the segments. In some embodiments, the initialization module 204 may first select one or more segments corresponding to the target (e.g., the user 110) based on predetermined criteria. During initialization of the robotic device 104, the user 110 may be required to stand in front of the robotic device 104 within a predetermined distance (e.g., 0.5 meter, one meter, 1.5 meters, two meters, etc.) and be as close to the center of the robotic device 104 as possible. The sensors 124 may obtain a measurement of the user 110 and the background environment. The initialization module 204 may obtain segments from the measurement clustering module 202, and select one or more segments within the predetermined distance from the robotic device 104 as the segments corresponding to the target. The initialization module 204 may also select one or more segments that are closest to the center of the sensor' 124 field of view (FOV) as the segments corresponding to the target.

In some embodiments, when a 2D or 3D laser scanner, a RGB-D camera, or a stereo camera is used, the initialization module 204 may choose the two segments within the predetermined distance to the robotic device 104 and closest to the center of the sensor FOV as the segments corresponding to the user 110. In some embodiments, the two selected segments may correspond to the user's 110 legs. In some embodiments, the chosen segment that is within a predetermined distance to the robotic device 104 and closest to the center of the sensor FOV may be corresponding to the user's middle body or back. In some embodiments, the initialization module 204 may include an object detector trained using machine learning and deep learning algorithms to classify and select the segments corresponding to the target. The object detector may be trained using the sensor data (such as 2D or 3D laser scan data, color and depth images obtained from a RGB-D camera or a stereo camera, and color images obtained from a monocular camera) measuring the user's 110 legs, back, or other part of the body of the user 110. Such an object detector may include a leg detector, a human middle body detector, a human whole body detector, etc. The machine learning and deep learning algorithms may include, but are not limited to, Adaboost, random forest, support vector machine (SVM), neural network (NN), deep convolutional neural network (CNN), etc.

Figure 3A:
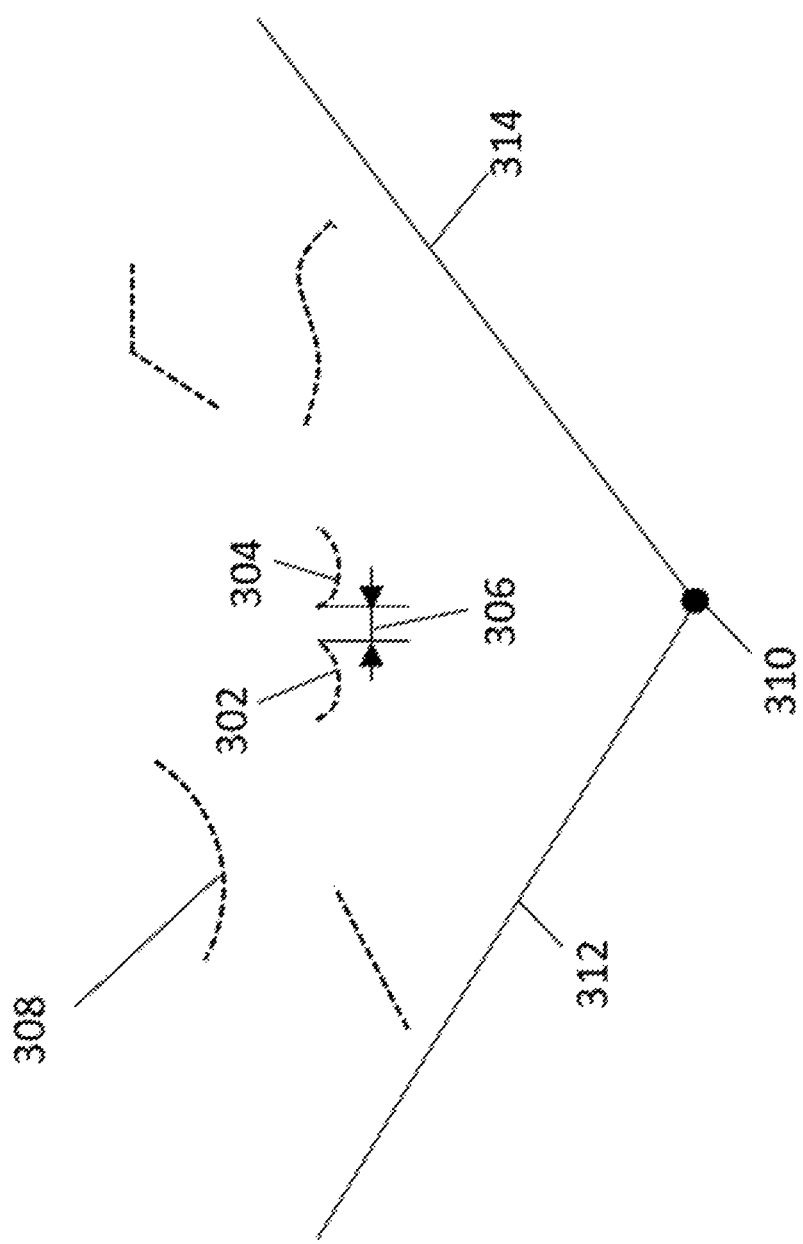
FIG. 3A illustrates a diagram of target features, in accordance with various embodiments.

After selecting the segments of the target, the initialization module 204 may extract the target features from the segments of the target by calling the feature extraction module 206 and store the target features in a data storage. In some embodiments, when a 2D laser scanner 124 is used, a segment corresponding to the user's 110 leg and a segment corresponding to the user's 110 middle body are both a convex curve. Referring to FIG. 3A, a diagram of target features is illustrated, in accordance with various embodiments. Element 310 represents a 2D or 3D laser scanner. Lines 312 and 314 represent a start angle and an end angle of the laser scanner 310, respectively. Within the range of the start angle 312 and the end angle 314, there may be one or more segments (e.g., segments clustered by the measurement clustering module 202). As described above, the initialization module 204 may select the segments corresponding to the target among the one or more clustered segments. For example, curves 302 and 304 represent segments corresponding to the user's 110 legs. A curve 308 represent a segments corresponding to the middle part of the body of the user 110. As shown in FIG. 3A, the curves 302 and 304, and the curve 308 are all convex curves.

In some embodiments, the segment's length, width, convex property, mean curvature, the radius of a fitting circle of the segment may be computed and used as the target features corresponding to a part or the whole target. For example, the convex curve in FIG. 3A may be used to extract the target features, e.g., a length, a width, convex property, a mean curvature, the radius of the curve, etc. As illustrated in FIG. 3A, the convex property means that the distance from an observation point to most of the scan points on the segment (e.g., 90%, 80% or 70% of all scan points) is less than the distance from the observation point to the corresponding points on a line formed by joining the two end points of the segment. The observation point may be at the laser scanner 310. In some embodiments, a separation distance between two segments (e.g., as represented by the element 306 between the curves 302 and 304 in FIG. 3A) may be computed and used as an additional target feature corresponding to the user's 110 legs. In some embodiments, when a 3D laser scanner is used, a segment corresponding to the user's 110 leg and a segment corresponding to the user's 110 middle body may present convex curves at multiple layers. A similar set of target features may be obtained by calculating the average values of the target features for the convex curves over a predetermined height range (e.g., 0.1 meter, 0.5 meter, one meter, etc.). In some embodiments, when a RGB-D camera or a stereo camera is used, the color and texture information of the selected segment may be used as another feature in addition to the target features described above.

In some embodiments, the initialization module 204 may also compute an initial location of the target based on the selected segments. In some embodiments, a target's location may be represented in the robot local coordinate frame. In the local coordinate frame, both Cartesian coordinate representation and polar coordinate (range and azimuth) representation may be used. In some embodiments, the Cartesian coordinates or polar coordinates of a horizontal center point of the segment corresponding to the user's 110 middle body (as shown by the curve 308 in FIG. 3A) may be used as the initial location of the target (e.g., the user 110) in the local frame. In some embodiments, the Cartesian coordinates or polar coordinates of the horizontal center point between the two segments corresponding to the user's 110 legs (as shown by the curves 302 and 304 in FIG. 3A) may be used as the initial location of the target (e.g., the user 110) in the local frame.

In some embodiments, the target's location may be represented in the world coordinate frame. The initialization module 204 may fuse the data from the GPS 124 equipped on the robotic device 104 with the data from other sensors 124 equipped on the robotic device 104 to provide location and pose information of the robotic device 104. The pose information may include a heading of the robotic device 104. For example, the initialization module 204 may fuse the GPS data with the odometry provided by the motor encoders, with the INS data, with the visual odometry captured by RGB-D camera or stereo camera, and with the odometry provided by the 2D or 3D laser scanner through scan matching. Once the robotic device's 104 pose are determined, the target's location in the local coordinate frame may be transformed into the world coordinate frame.

In some embodiments, the initialization module 204 may compute the target features aforementioned and the initial location of the target based on the sensor measurements obtained at a single time instant. In some embodiments, to reduce the effect of the measurement noise, the target features and the initial location of the target may also be obtained by calculating average values of the target features and an average value of the initial locations obtained over a time window. The time window may be five seconds, 10 seconds, 20 seconds, etc.

The feature extraction module 206 may use the segments generated by the measurement clustering module 202 as inputs and extract the features based on the segments. As described above with reference to the initialization module 204, depending on the specific sensor that is being used, the features may include the segment's length, the segment's width, the convex property of the segment, the mean curvature of the segment, the radius of the fitting circle of the segment, the segment color and texture, and the separation distance between two segments, etc. The feature extraction module 206 may provide the extracted features of the segments to the filtering module 208 for next operations.

The filtering module 208 may receive all the segments obtained at the current time instant and the corresponding features of the segments as the inputs from the other components of the tracking module 134, and filter out the segments with the features that are incompatible with the target features obtained by the initialization module 204 and/or stored in the data storage. The filtering module 208 may select one or more candidate segments by filtering out the incompatible segments. The one or more candidate segments may be more likely corresponding to a part or the whole body of the target. For example, there may be many segments in a cluttered environment that do not correspond to a part or the whole of the target (e.g., the user's 110 legs, middle body part of the user 110, back of the user, etc.). These segments may correspond to other objects, e.g., chairs, tables, boxes, house pillars, walls, or other people. The filtering module 208 may remove these false positive segments by comparing the features of the segments with the initially stored target features. For example, the filtering module 208 may remove the segments that do not have convex property, e.g., walls, etc. In another example, the filtering module 208 may remove the segments with the length and width that are substantially smaller or larger than the target length and width (e.g., more than 30%, 50%, 60%, or 80% smaller or larger, or one time smaller or larger). In yet another example, the segments with the colors or textures that are substantially different from the target's color or texture may also be removed. In some embodiments, when the user's 110 legs are detected, segments with a separation distance substantially larger or smaller (e.g., more than 30%, 50%, 60%, or 80% smaller or larger, or one time smaller or larger) than the stored separation distance between the two segments of the user's 110 legs may not be considered as the leg segments and thus may be filtered out. In some embodiments, the filtering module 208 may perform comparisons between many or all types of the features to determine whether a segment corresponds to the target. In some embodiments, the filtering module 208 may pass each segment to an object classifier to classify whether it corresponds to the target. The object classifier may be trained based on the sensor data using the machine learning algorithms, such as Adaboost, random forest, SVM, NN, deep CNN, etc. The segments that are not classified as the target segment may be removed by the filtering module 208.

The prediction module 210 may predict a potential location of the target at the current time instant based on historical locations of the target. The initial location of the target may be stored by the initialization module 204 in the data storage at the first time instant and other historical locations of the target may be stored by the determination module 212 at every past time instant. In some embodiments, the prediction module 210 may predict a potential location of the target at the current time by processing the historical locations of the target over a time window, as illustrated in FIG. 3B.

Figure 3B:
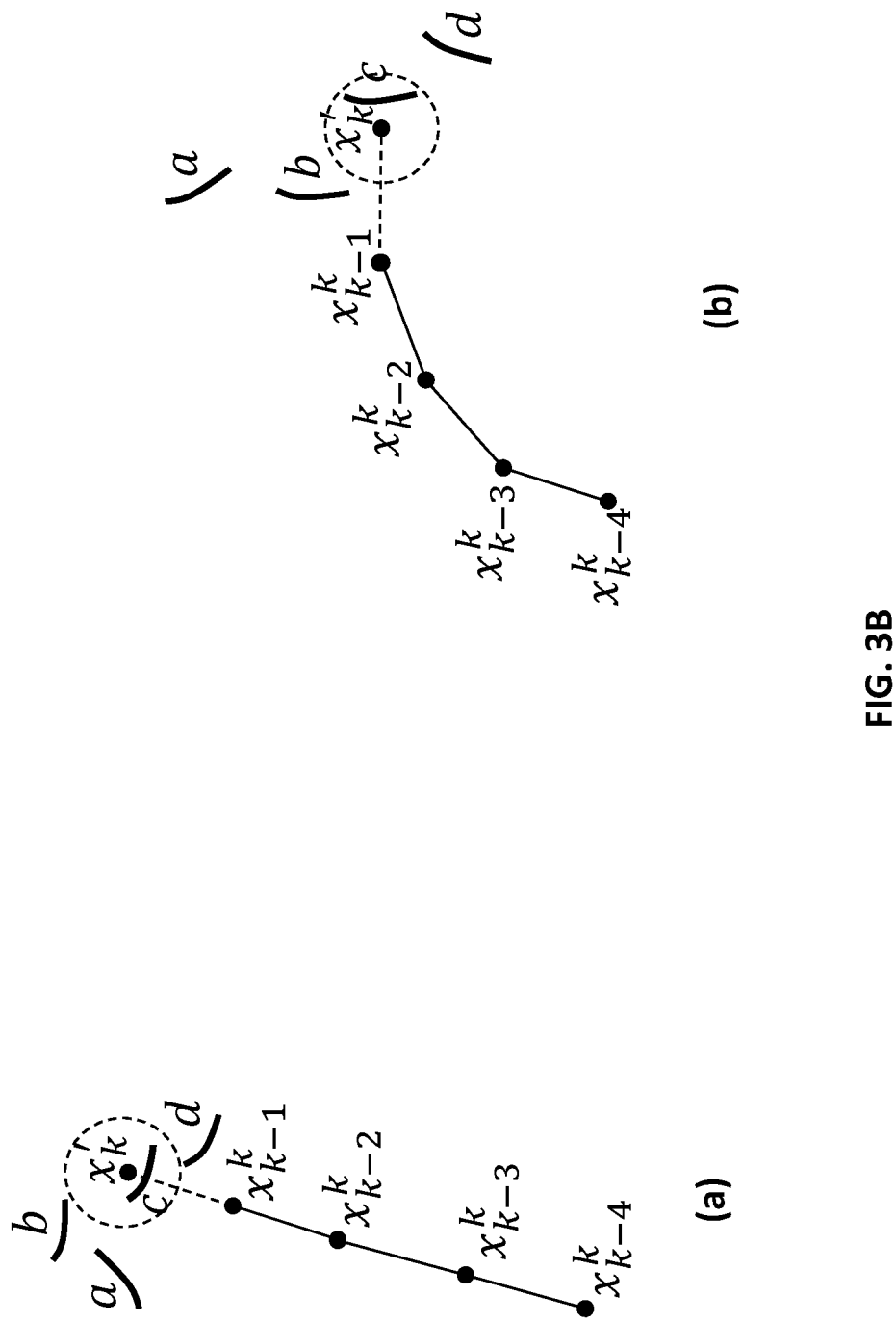
FIG. 3B illustrates a diagram of predicting a potential location of a target, in accordance with various embodiments.

Referring to FIG. 3B, a diagram of predicting a potential location of a target is illustrated, in accordance with various embodiments. In FIG. 3B(a) and (b), points $x_{k-1}^k$, $x_{k-2}^k$, $x_{k-3}^k$, and $x_{k-4}^k$ represent the locations of the target at previous four time instants, k−1, k−2, k−3, k−4, expressed in the local coordinate frame of the robotic device 104 at time instant k. The previous locations of the target, $x_{k-1}^k$, $x_{k-2}^k$, $x_{k-3}^k$, and $x_{k-4}^k$, may be determined by segments captured at the previous time instants, k−1, k−2, k−3, k−4. Point $x_k'$ represents a predicted location of the target at time instant k. The dashed circles centered at $x_k'$ in (a) and (b) represent the areas, segments outside of which are not considered as the target. Curves a, b, c, d represent four laser scan segments obtained at time instant k.

In FIG. 3B (a), angles between the four previous locations of the target do not vary too much. This observation indicates that the target is moving in a nearly straight line. In FIG. 3B (b), the trend or trajectory of the four previous target locations indicates that the target is making a right turn.

Based on the four previous target locations, $x_k'$ may be predicted as the sum of the last target location and the average of the three previous position changes, which is given by $x_k' = x_{k-1}^k + \frac{1}{3}\sum_{i=1}^{3} - x_{k-(i-1)}^k$. In some embodiments, to give higher priorities to the most recent position changes, $x_k'$ may also be predicted as the sum of the last target location and the weighted average of the three previous position changes, which is given by $x_k' = x_{k-1}^k + \frac{1}{3}\sum_{i=1}^{3} w_i * (x_{k-i}^k - x_{k-(i-1)}^k)$, where the weights satisfy $\sum_{i=1}^{3} w_i = 1$, $w_1 > w_2 > w_3$.

In some embodiments, the prediction module 210 may fit the historical locations of target into a polynomial and use the polynomial to predict the target location at current time instant. The polynomial may be a first-order straight line, a second-order quadratic polynomial, or a higher order polynomial. Any number of historical locations can be used. For example, 3-10 historical locations are fit into a certain order polynomial. For example, in FIG. 3B (a), the prediction module 210 fits the historical data into a straight line. For another example, in FIG. 3B (b), the prediction module 210 fits the historical data into a quadratic line. In some embodiments, the prediction module 210 may fit the historical locations of target into a spline.

In some embodiments, the prediction module 210 may perform polynomial or spline fitting at each time instant. In some embodiments, the prediction module 210 may use parameter estimation methods to estimate the parameters of the polynomial or spline at every time instant and use the polynomial or spline with the estimated parameters to predict the target location at a current time instant. Examples of the parameter estimation methods include, but are not limited to, Kalman Filter, recursive least square, RANSAC-based parameter estimation, etc. In some embodiments, the prediction module 210 may predict a location of the target based on a polynomial with the estimated parameters, select one or more segments compatible with the predicted location of the target from clustered segments, and update current states of the parameters of the polynomial or spline by using a currently determined location of the target based on the one or more selected segments and one or more historical locations of the target in the parameter estimation methods such as Kalman Filter.

In some embodiments, the prediction module 210 may use a Kalman Filter to predict the location of the target in Cartesian coordinates by using a constant velocity model of the target's motion. The constant velocity model assumes that the target moves at the same speed and along the same direction. With the constant velocity model, the location of the target at the current time instant may be predicted based on the location and velocity estimated by the Kalman filter at previous time instant.

In some embodiments, the location of the target may be presented by using a polar coordinate representation in the robotic device's 104 local coordinate frame. The prediction module 210 may employ an Extended Kalman Filter (EKF) to estimate the range and the azimuth to the target at each time instant based on the motion model of the target relative to the robotic device 104 in polar coordinates. The polar coordinate representation is compatible with the sensor range and bearing data. In addition, the location of the target in terms of range and azimuth may also be directly used by the control module 138 to generate a velocity and/or an angular velocity commands to maintain the robotic device 104 with the desired range and azimuth angle to the target without transforming to the Cartesian coordinates. Therefore, using the polar coordinate representation saves computation cost of transforming the sensor data to the Cartesian coordinates and removes possible errors brought by the coordinate transformation. In addition, using the polar coordinate representation in the local frame of the robotic device 104 saves the computation cost of transformation between the local coordinate frame and the world coordinate frame, which is needed if the location of the target is represented in the world coordinate frame. Therefore, the polar coordinate representation significantly reduces the computation cost and removes the error introduced by the transformation between the local and world coordinate frames and the transformation between the polar and Cartesian coordinate frames.

Figure 3C:
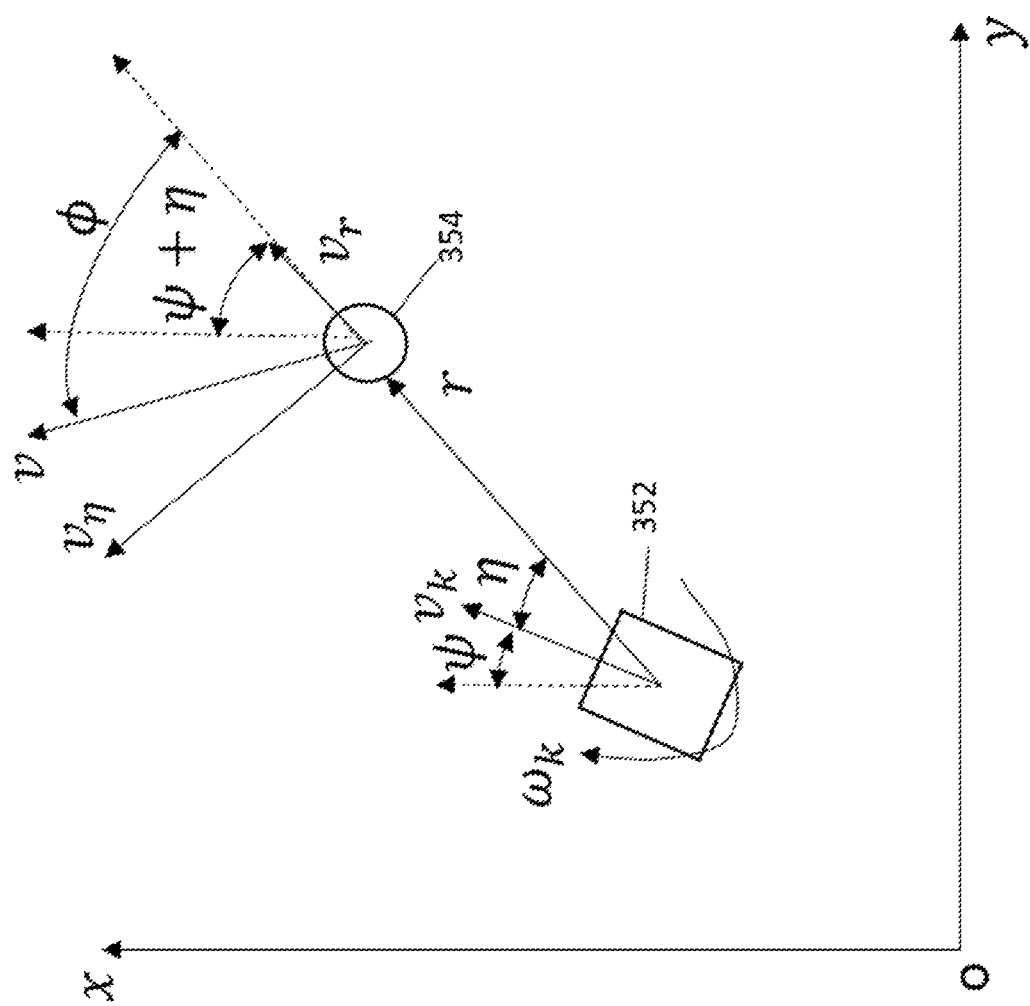
FIG. 3C illustrates a geometry diagram for deriving a motion model of the target relative to the robotic device in polar coordinates, using a constant velocity model of the target's motion, in accordance with various embodiments.

FIG. 3C shows the geometry that is used to derive a motion model of the target relative to the robotic device 104 in polar coordinates, using a constant velocity model of the target's motion, in accordance with various embodiments. In the embodiments of FIG. 3C, box 352 and circle 354 represent the robotic device 104 and the target, respectively. Vectors $v_k$ and $\omega_k$ represent the velocity and the angular velocity of the robotic device 104 at time instant k respectively. The velocity $v_k$ and angular velocity $\omega_k$ may be obtained from the odometry provided by the motor encoders. Angle $\psi$ is the heading angle of the robotic device 104. Vector r represents the range or distance to the target. Angle $\eta$ is the azimuth angle to the target. Vector v represents the velocity of the target, and vector $c_r$ is the projection of the target's velocity v onto the direction of the range vector r. Vector $v_\eta$ is the projection of v onto the direction that is orthogonal to $v_r$, and angle $\phi$ is the angle between v and $v_r$. Equations of motion of the target relative to the robotic device 104 in terms of range and azimuth angle may be derived as $$\dot{r} = v_r - v_k\cos\eta, \quad \dot{\eta} = \frac{v_k\sin\eta}{r} - \omega_k - \frac{v_\eta}{r}, \quad \dot{v}_r = -v_\eta\left(\frac{v_k\sin\eta}{r} - \frac{v_\eta}{r}\right),$$

$$\dot{v}_\eta = v_r\left(\frac{v_k\sin\eta}{r} - \frac{r_\eta}{r}\right).$$

Note that the above equations of motion of the target in polar coordinates use the constant velocity model of the target's motion. Using the equations of motion, the range and azimuth to the target at the current time instant may be predicted based on the range r, azimuth $\eta$, $v_r$ and $v_\eta$ estimated by the EKF at the previous time instant.

Figure 3D:
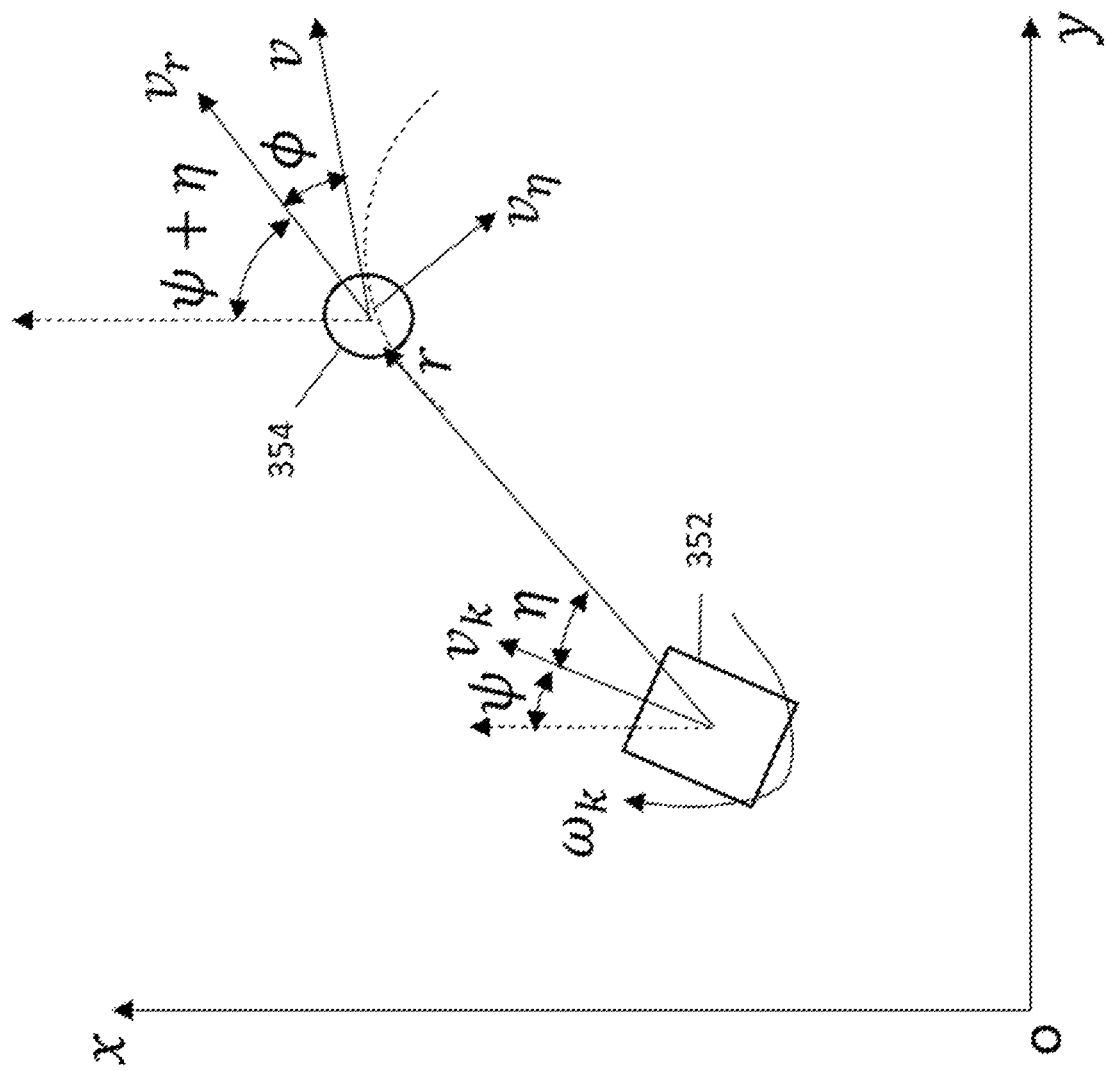
FIG. 3D illustrates a geometry diagram for deriving a motion model of the target relative to the robotic device in polar coordinates, using the constant speed and constant turn rate model of the target's motion, in accordance with various embodiments.

In some embodiments, the prediction module 210 may use a constant speed and constant turn rate model of the target's motion to better predict a potential location of the target in a turning scenario. FIG. 3D shows the geometry that is used to derive the motion model of the target relative to the robotic device 104 in polar coordinates, using the constant speed and constant turn rate model of the target's motion, in accordance with various embodiments. Similar to FIG. 3C, the box 352 and the circle 354 represent the robotic device 104 and the target, respectively. Vectors $v_k$ and $\omega_k$ represent the velocity and the angular velocity of the robotic device 104 at time instant k respectively. Angle $\psi$ is the heading angle of the robotic device 104. Vector r represents the range or distance to the target, and vector $\eta$ is the azimuth angle to the target. Vector v represents the velocity of the target, and vector $v_r$ is the projection of the target's velocity v onto the direction of the range vector r. Vector $v_\eta$ is the projection of v onto the direction that is orthogonal to $v_r$, and angle $\phi$ is the angle between v and $v_r$. Equations of motion of the target relative to the robotic device 104 in terms of range and azimuth angle may be derived as $$\dot{r} = v_r - v_k \cos\eta, \dot{\eta} = \frac{v_k \sin\eta}{r} - \omega_k + \frac{v_\eta}{r}, \dot{v}_r = -v_\eta\left(\omega' - \frac{v_k \sin\eta}{r} - \frac{v_\eta}{r}\right),$$

$$\dot{v}_\eta = v_r\left(\omega' - \frac{v_k \sin\eta}{r} - \frac{v_\eta}{r}\right), \dot{\omega}' = 0.$$

Note that the above equations of motion of the target in polar coordinates use the constant speed and constant turn rate model of the target's motion. Using the equations of motion, the range and azimuth to the target at the current time instant may be predicted based on the range r, azimuth $\eta$, $v_r$, $v_\eta$, and $\omega'$ estimated by the EKF at the previous time instant.

In some embodiments, the prediction module 210 may use a Kalman Filter to predict the location of the target in Cartesian coordinates or polar coordinates based on a constant acceleration model of the target's motion. In some embodiments, the prediction module 210 may use a Kalman Filter to predict the location of the target in Cartesian coordinates or polar coordinates based on a constant acceleration and constant turn rate model of the target's motion.

In some embodiments, the two or more motion models of the target relative to the robotic device 104 may be combined to take into account both the straight line motion and the turning motion of the target. In some embodiments, the interactive multiple model (IMM) approach may be employed to determine, based on the measurements obtained by the sensors, the appropriate model from the two or more above described motion models to be used online or in real time.

The determination module 212 may receive a set of candidate segments from the filtering module 208, which may have the features corresponding to the target. The determination module 212 may also receive a predicted target's location provided by the prediction module 210. In some embodiments, the determination module 212 may determine which one or more segments among the set of candidate segments correspond to a part or the whole body of the target. In addition, the determination module 212 may update and store the target's location at the current time instant in the data storage.

In some embodiments, the determination module 212 may select the one or more segments corresponding to the target based on the historical locations of the target and/or target motion constraints. The determination module 212 may further reduce the false positive segments introduced by the surrounding objects of the same kind as the target, e.g. other people's legs, middle bodies, or backs, etc. In some embodiments, based on the predicted location $x_k'$ of the target, as predicted by the approach illustrated in FIG. 3B, the determination module 212 may only select one or more segments within the circular area centered at $x_k'$ when determining the target's location at the time instant k. For example, as shown in FIG. 3B, the only segment within the circular area centered at $x_k'$ is the segment c. The determination module 212 may determine that the segment c corresponds to the target, and the location of the segment c is the target's location at the time instant k. In some embodiments, the radius of the circular area centered at predicted location $x_k'$ of the target is predetermined. For example, the radius of the circular area centered at predicted location $x_k'$ of the target may be 0.1 meter, 0.5 meter, 1 meter, etc. In some embodiments, there may be multiple segments within the circular area centered at predicted location $x_k'$ of the target. In such embodiments, the determination module 212 may determine that the segment closest to $x_k'$ is selected as the one corresponding to the target, and the location of the determined segment is the location of the target. If there are not segments in the circular area centered at predicted location $x_k'$ of the target, then the determination module 212 may use the predicted location $x_k'$ as the true location of target for the time instant k.

In some embodiments, the determination module 212 may select the segments that match the target's location predicted by the Kalman Filter or EKF by using data association algorithms. Such algorithms may include, but are not limited to, Nearest Neighbor (NN), joint compatibility branch and bound, probabilistic data association, Hungarian method, etc. Once the segments are selected, the Kalman Filter or EKF updates the target's location for the current time instant and stores the target's location. In some embodiments, the target's location may be parameterized using polar coordinates in the robotic device's 104 local frame, as described above with reference to the prediction module 210. For the constant velocity model of the target's motion, let $x^{CV}=[r, \eta, v_r, v_\eta]^T$ represent the state vector of the system and let $z^{CV}=[r,\eta]^T$ represent the observation vector. The observation model may be given by $z^{CV}=H^{CV}x^{CV}$, where $$H^{CV} = \begin{bmatrix} 1, 0, 0, 0 \\ 0, 1, 0, 0 \end{bmatrix}.$$

For the constant speed and constant turn rate model of the target's motion, let $x^{CSCT}=[r, \eta, v_r, v_\eta, \omega]^T$ represent the state vector and let $z^{CSCT}=[r, \eta]^T=[r, \eta]^T$ represent the observation vector. The observation model may be given by $z^{CSCT}=H^{CSCT}x^{CSCT}$ where $$H^{CSCT} = \begin{bmatrix} 1, 0, 0, 0, 0 \\ 0, 1, 0, 0, 0 \end{bmatrix}.$$

When no obstacles can be associated with the target, the determination module 212 may use the predicted location of the target obtained in the prediction step of the Kalman Filter or EKF as the true location of the target for the time instant k.

The optional second tracking module 136 may be communicatively connected to the first tracking module 134 and predict a location of the target using RF based methods. The second tracking module 136 may send the predicted location of the target based on RF signals to the first tracking module 134 to further improve the tracking performance. For example, the first tracking module 134 may fuse the predicted location of the target by the second tracking module 134 with the determined location of the target as described above to more efficiently generate a final tracking result.

In some embodiments, the second tracking module 136 may generate a region of interest about the target's location. For example, the second tracking module 136 may compute the region of interest by using a localization approach based on Bluetooth communication technologies. Since most cellular phones have equipped with Bluetooth communication devices, the robotic device 104 may be equipped with one or more Bluetooth beacons so that the region of interest may be computed based on the communication between the Bluetooth beacons equipped on the robotic device 104 and the Bluetooth device built in the cellular phone of the user 110, without requiring an additional device attached to the user 110. The first tracking module 134 may use the region of interest to further filter out the false positive segments or false positive locations of the target. In some embodiments, the second tracking module 136 may generate the region of interest about the target's location relative to the robotic device 104 using GPS data. For example, the second tracking module 136 may calculate a region of interest about the target's location relative to the robotic device 104 based on the target's locations provided by the GPS device 124 equipped on the robotic device 104 and the GPS component built in the cell phone within a predetermined time window. In some embodiments, the second tracking module 136 may compute the region of interest about the target's location by using UWB or RFID communication technologies.

The control module 138 may be communicatively connected to the user interaction module 132, the first tracking module 134, and the optional second tracking module 136. The control module 138 may receive the outputs of the other components of the computing device 122 (e.g., the modules 132, 134, 136) as inputs and generate control commands for the motors 128. Based on the target's location obtained from the first tracking module 134 and/or the second tracking module 136, the control module 138 may generate the control commands for the motors 128 to drive the robotic device 104 to the desired location relative to the target. In some embodiments, the first tracking module 134 and/or the second tracking module 136 may produce a range r to the target and an azimuth η to the target. The control module 138 may apply a proportional-integral-derivative (PID) controller to generate velocity and angular velocity commands for the robotic device 104, which may then be converted to rotational speed commands for the left and right motors 128 to drive the range r and azimuth η to the desired range $r^d$ and azimuth $η^d$. In some embodiments, the control module 138 may use other control algorithms to generate the velocity and angular velocity commands for the robotic device 104. Such algorithms may include, but are not limited to, Lyapunov-based control algorithm, adaptive control algorithm, sliding model control algorithm, etc.

The desired range $r^d$ and azimuth angle $η^d$ to the target may be set to any configurations of relative locations between the target and the robotic device 104. For example, the robotic device 104 may be in front of, on the side of, in the side front of, or behind the target. In particular, the control module 138 may allow the robotic device 104 to be placed and autonomously moving in front or side front of the target such as the user 110, which maintains the robotic device 104 in the vision of the user 110. Therefore, the user 110 is enabled to see the robotic device 104 all the time of walking or running, without having to frequently look back to check the status of the robotic device 104, which is the case when the robotic device 104 is placed behind the target. In addition, the robotic device 104 being able to autonomously moving in front or side front of the user 110 facilitates better interactions between the robotic device 104 and the user 110.

In some embodiments, when the configuration is that the robotic device 104 is placed in front of or in side front of the user 110 for following the user 110, the robotic device 104 may also predict the user's 110 location at some future time instant and then the control module 138 may drive the robotic device 104 to a location with the desired range and azimuth to that predicted future location of the user 110. In some embodiments, the user's 110 location at the future time instant may be predicted using polar coordinates in the robotic device's 104 local coordinate frame, using either the constant velocity model or the constant speed and constant turn rate model, as described with reference to the prediction module 210. The both models give the range and azimuth to the user 110 at the future time instant. In some embodiments, the IMM may be used to combine the two models to predict the future location of the user 110 by selecting the appropriate model in real time based on the sensor measurement.

In some embodiments, the target's location at the future time instant may be predicted using Cartesian coordinates in the world coordinate frame, using either the constant velocity model or the constant speed and constant turn rate model. For the constant velocity model, the equations of motion of the robotic device 104 in the world coordinate frame is given by $x_{k+1}=x_k+v_x\Delta_t$, $y_{k+1}=y_k+v_y\Delta_t$, $v_{x,k+1}=v_{x,k}$, $v_{y,k+1}=v_{y,k}$, $\psi_{k+1}=\psi_k$, where $\Delta_t$ represents the sample period; $x_k$, $y_k$, and $x_{k+1}$, $y_{k+1}$ represent the x-y coordinates of the target's location in the world coordinate at the time instant k and k+1, respectively; $v_{x,k}$, $v_{y,k}$, and $v_{x,k+1}$, $v_{y,k+1}$ represent the target's velocity in x and y directions at the time instant k and k+1, respectively; $\psi_k$ and $\psi_{k+1}$ represent the target heading at the time instant k and k+1, respectively. For the constant speed and constant turn rate model, $x_{k+1}=x_k+v_k \cos \psi_k \Delta_t$, $y_{k+1}=y_k+v_k \sin \psi_k \Delta_t$, $v_{k+1}=v_k$, $\psi_{k+1}=\psi_k$, where $x_k$, $y_k$, $x_{k+1}$, $y_{k+1}$ represent the x-y coordinates of the target's location in the world coordinate at the time instant k and k+1, respectively; $v_k$ and $v_{k+1}$ represent target's speed at time instant k and k+1, respectively; and $\psi_k$ and $\psi_{k+1}$ represent the target's heading at the time instant k and k+1, respectively. In some embodiments, the IMM may be used to combine the two models to predict the future location of the target by selecting the appropriate model in real time based on the sensor measurement.

In some embodiments, the control module 138 may generate a goal configuration for the robotic device 104 based on the target's future location and the measurements obtained from the sensors 124. In some embodiments, when the control module 138 detects that the predicted future location of the target is not feasible to reach (e.g., inside a wall, onto a house pillar, into a pond or lake, or colliding with other people or obstacles) or not accessible (e.g., closed door, locked entrance, gated entrance, etc.), the control module 138 generate a goal configuration for the robotic device 104. For example, when the user 110 walks towards a wall, based on the sensor measurements obtained at the current time instant, the predicted location of the user 110 may collide with the wall. In such a situation, the control module 138 may cooperate with the user interaction module 132 (through the communication device 126) to send a warning signal to the user 110, or send an instruction to the control device 102 for sending a warning signal to the user 110. For example, the warning signal may be an audio display warning the user 110 of the obstacles or people the user 110 is colliding onto. In another example, the warning signal may be a video display showing the obstacles or people the user 110 is bumping onto. Other types of warning signals are possible to be generated by the user interaction module 132 or the control device 102 to remind the user 110 of the obstacles or other people the user 110 is colliding onto. In some embodiments, the user interaction module 132 (through the communication device 126) or the control device 102 may also provide a user interface enabling the user 110 to take control, e.g., shifting back to the manual mode.

In some embodiments, when the control module 138 detects that the predicted future location of the target is not feasible, the control module 138 may also return a signal to the first tracking module 134 and/or the optional second tracking module 136 for adjusting the predicted future location. In some embodiments, when the control module 138 detects that the predicted future location of the target is not feasible, the control module 138 may directly start the goal configuration for the robotic device 104. Under such a goal configuration, the control module 138 may adjust the predicted future location of target by analyzing the goal of the target. For example, when the user 110 is colliding with a wall while playing with the cell phone, the control module 138 may predict that the user 110 may actually intend to turn around and move toward to the opposite direction, or turn right or left and moving along the wall. Therefore, the control module 138 may generates the goal configuration that causes the robotic device 104 to turn around, or turn right or left. In another example, when the user 110 approaches a side wall of a hallway/corridor where there is only a door/room on the front left of the user 110 along the hallway, based on the sensor measurement and predicted location of the user 110, the control module 138 may realize that the user 110 is aiming to enter the door/room on the left, and therefore may generate the goal configuration for the robotic device 104 to turn left through the door. In yet another example, when the user 110 approaches an intersection where he/she can go straight, turn left and right, the control module 138 may use the predicted location of the user 110 and the sensor measurements to generate the goal configuration which causes the robotic device 104 to choose the direction the user 110 is aiming at. For example, if the predicted location of the user 110 is on the right wing of the intersection, the control module 138 may generate the goal configuration causing the robotic device 104 to turn right.

In some embodiments, the control module 138 may use the sensor data to detect and recognize the user's intent and drive the robot to the goal location based on the user's intent. For example, the control module 138 may detect and recognize the user's hand and/or body gestures using computer vision and machine learning techniques to determine the goal location where the user intends to be, and drive the robot device 104 to that goal location.

In some embodiments, the target (e.g., the user 110) may move out of field of view (FOV) of the sensors 124 equipped on the robotic device 104. In such embodiments, the control module 138 may drive the robotic device 104 to the predicted location of the target, as illustrated above with reference to the determination module 212 of the first tracking module 134. by doing so, the control module 138 prevents the robotic device 104 from tracking other objects in the environment or from losing the target forever. In addition, by doing so the control module 138 enables the robotic device 104 to move towards the predicted location of the target based on the historical locations of the target even though the target is not in the FOV of the sensors 124. In some embodiments, the control module 138 may drive the robotic device 104 to the target's location obtained from the optional second tracking module 136 when the target moves out of FOV of the sensors 124. In some embodiments, the control module 138 may also drive the robotic device 104 to a location obtained by fusing the target's location obtained from the optional second tracking module 136 and the predicted location of the target provided by the determination module 212 of the first tracking module 134 when the target moves out of FOV of the sensors 124. In some embodiments, the control module 138 may use sensor data to build a local map of the robotic device 104 and based on the local map apply the motion planning algorithms to generate a collision-free path to the goal configuration. The goal configuration is computed based on the target's location determined by the first tracking module 134 and/or the second tracking module 136, and the desired range $r^d$ and azimuth $\eta^d$ to the target. The motion planning algorithms may include, but are not limited to Dijkstra's algorithm, A*, D*, Rapidly-Exploring Random Tree(RRT), RRT*, potential field, probabilistic road map, etc. In some embodiments, the control module 138 may stop, based on sensor data, the robotic device 104 to avoid colliding of the robotic device 104 with immediately popped-up obstacles.

In some embodiments, the control module 138 may perform goal seeking and obstacle avoidance by using reactive path planning algorithms. For example, the control module 138 may use a dynamic window approach to produce the velocity and angular velocity commands to the robotic device 104. The control module 138 may use the dynamic window approach to generate several paths for the robotic device 104 by applying a fixed number of the velocity and angular velocity combinations. A cost is computed for each path based on several criteria, such as the distance between the path and the obstacles, the distance between the path and the goal, etc. A high cost is assigned to the path that is close to the obstacles and a low cost is assigned to the path that does not collide with obstacles while quickly leading to the goal. Based on the dynamic window approach, the control module 138 may select the path with the lowest cost and output the velocity and angular velocity commands to the robotic device 104. In some embodiments, the locations of the goal and the obstacles in the environment may be represented in polar coordinates (range and azimuth) in the robotic device's 104 coordinate frame, as described with reference to the prediction module 210 of the first tracking module 134. In this way, it is very efficient to compute the range and azimuth to the goal and the obstacles in the environment for a predicted future location obtained by applying a combination of velocity and angular velocity commands to the robotic device 104. Therefore, it is very easy to check how far a generated path is from the goal and the obstacles in the environment and it is very easy to evaluate the cost of the path.

In some embodiments, the control module 138 may drive the robotic device 104 to follow the path formed based on the historical locations of the target stored at previous time instants. Following the path may be achieved by continuously driving the robotic device 104 to several or all of historical locations of the target. By doing so, the robotic device 104 is capable of exactly following the target's path even when the target is making a turn, instead of cutting the corner to follow the target, which happens when only the current location of the target is considered.

The control module 138 may receive the outputs from the user interaction module 132 and perform corresponding actions so that the user 110 may manually control the robotic device 104 or control the robotic device 104 through the control device 102 (e.g., the user's 110 cell phone) and the sensors 124. For example, the user 110 may disable an autonomous mode by switching the robotic device 104 to a manual control mode. The user 110 may control the robotic device 104 by a hand gesture.

In some embodiments, the robotic device 104 may also have a function of leading the user 110 back to the original position when the user 110 started moving or back to the places where the user 110 visited. This function is important for the user 110 who is traveling in unknown or unfamiliar environments. The user 110 may get lost after making a few turns and may not be able to return to the original location or the visited places. To achieve this functionality, the robotic device 104 may store a number or all of its historical locations, especially the locations where the robotic device 104 has made turns. In some embodiments, the locations of the robotic device 104 may be computed by fusing the GPS data with the data from INS or other sensors equipped on the robotic device 104 during its target following mode. In some embodiments, the locations of the robotic device 104 may be computed by WiFi-based localization method or Simultaneously Localization and Mapping (SLAM) technologies. For example, the SLAM technologies are based on sensors such as monocular camera, stereo camera, RGBD camera, and/or laser scanner, etc. In some embodiments, the path formed by the locations of the robot device 104 may be smoothed to remove local oscillation. The locations where the robotic device 104 has made turns may be determined by checking changes of the angles of the robotic device's 104 moving directions along the smoothed path. If a change of the angle is larger than a threshold, then the points where the robotic device 104 started changing its moving direction are the turning locations. When the user 110 selects such a function (e.g., by choosing a leading mode of the robotic device 104), the control module 138 may process all the stored historical locations of the robotic device 104 and construct a graph where the graph nodes include a starting/orignal location, a goal location, and the robot turning locations. Based on the graph, the control module 138 generates the shortest route to the original location, which may include multiple or all of the historical locations of the robotic device 104. The shortest route may be determined by applying Dijkstra's algorithm, A*, dynamic programming, and other graph search algorithms. The control module 138 may then maneuver the robotic device 104 to follow the shortest route to the original location and the user 110 is enabled to follow the robotic device 104 back to the original location.

In addition, the user 110 may be able to add a place to the list of the visited places through the user interaction module 132 and/or the control device 102 that he/she may potentially like to revisit. The list of the visited places may be stored in the data storage. When the user 110 wants to revisit some place, he/she may select the place from the list of the visited places. Then similar to the original position, the control module 138 may process all the stored historical locations of the robotic device 104 to generate the shortest route to that visited place, which may include multiple or all of the historical locations of the robot device 104. The control module 138 may then maneuver the robotic device 104 to follow the shortest route to the visited place and the user 110 is enabled to follow the robotic device 104 back to the visited place.

This functionality does not require a prior map or building a map about the environment since during the target following mission the user 110 has led the robotic device 104 to navigate the environment and useful or key locations (e.g., the turning points) have been stored. Then the robotic device 104 may use the stored useful locations to navigate back to the original location or visited places. This functionality eases the user's 110 operation for going back to already visited places by just following the robotic device 104. The user 110 does not need to search the original location or visited places over the cell phone and navigate back to the original location or visited places by continuously looking at the generated path on the cell phone.

Figure 4A:
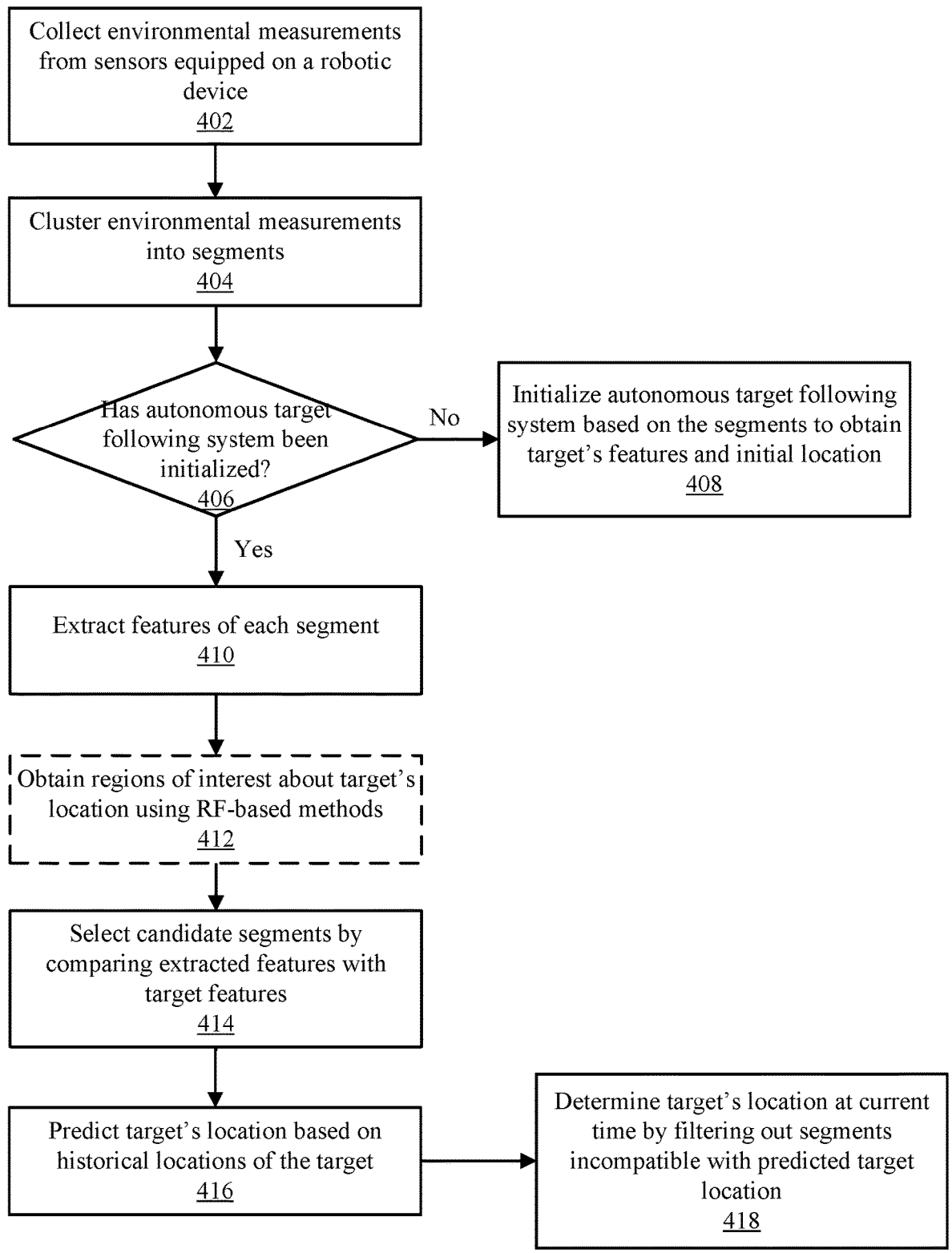
FIG. 4A illustrates a flowchart of an exemplary autonomous target following method, in accordance with various embodiments.

FIG. 4A illustrates a flowchart of an exemplary method 400 for autonomous target following, according to various embodiments of the present disclosure. The method 400 may be implemented in various environments including, for example, the system 100 of FIG. 1. The exemplary method 400 may be implemented by one or more components of the system 100 (e.g., the robotic device 104). The exemplary method 400 may be implemented by multiple systems similar to the system 100. The operations of method 400 presented below are intended to be illustrative. Depending on the implementation, the exemplary method 400 may include additional, fewer, or alternative steps performed in various orders or in parallel.

At block 402, environmental measurements may be collected from sensors 124 equipped on the robotic device 104. At block 404, the environmental measurements may be clustered into multiple segments. At block 406, it may be determined whether the autonomous target following system (e.g., the robotic device 104) has been initialized. If it is determined that the autonomous target following system (e.g., the robotic device 104) has not been initialized, at block 408, the autonomous target following system may be initialized based on the segments to obtain target's features and an initial location of the target. If it is determined that the autonomous target following system (e.g., the robotic device 104) has been initialized, at block 410, features of each segment clustered at block 404 may be extracted.

At block 412, optionally, regions of interest about the target's location may be obtained by using RF-based methods. At block 414, candidate segments may be selected among all segments clustered at block 404 by comparing the features of the segments extracted at block 410 with the target's features obtained at block 408 (initialization of the system). At block 416, a target's location may be predicted based on historical locations of the target. At block 418, the target's location at current time may be determined by filtering out segments incompatible with predicted target's location at block 416.

Figure 4B:
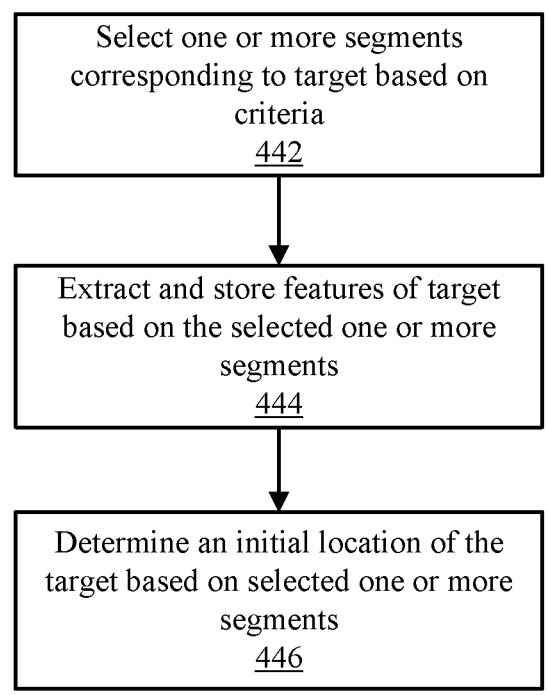
FIG. 4B illustrates a flowchart of an exemplary initialization method, in accordance with various embodiments.

FIG. 4B illustrates a flowchart of an exemplary method 408 for initialization of a robotic device 104, according to various embodiments of the present disclosure. The method 408 may be implemented in various environments including, for example, the system 100 of FIG. 1. The exemplary method 408 may be implemented by one or more components of the system 100 (e.g., the robotic device 104). The exemplary method 408 may be implemented by multiple systems similar to the system 100. The operations of method 408 presented below are intended to be illustrative. Depending on the implementation, the exemplary method 408 may include additional, fewer, or alternative steps performed in various orders or in parallel.

At block 442, one or more segments corresponding to the target may be selected based on criteria. At block 444, features of the target may be extracted based on the selected one or more segments. The extracted target's features may also be stored in a data storage. At block 446, an initial location of the target may be determined based on selected one or more segments.

Figure 5A:
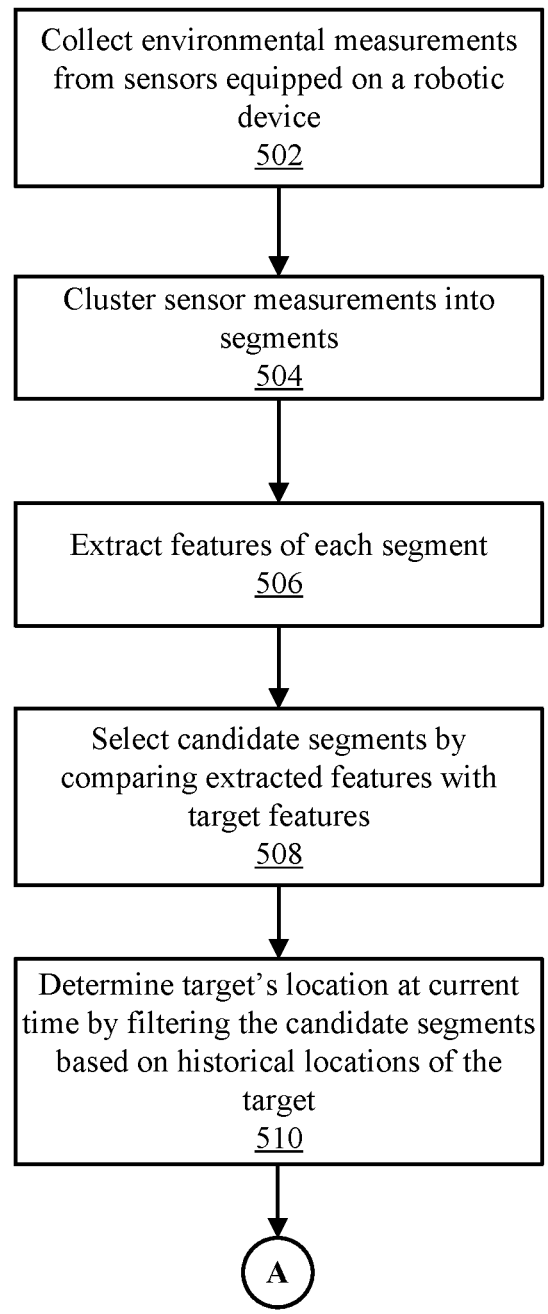
FIGS. 5A-5B illustrate a flowchart of another exemplary autonomous target following method, in accordance with various embodiments.
Figure 5B:
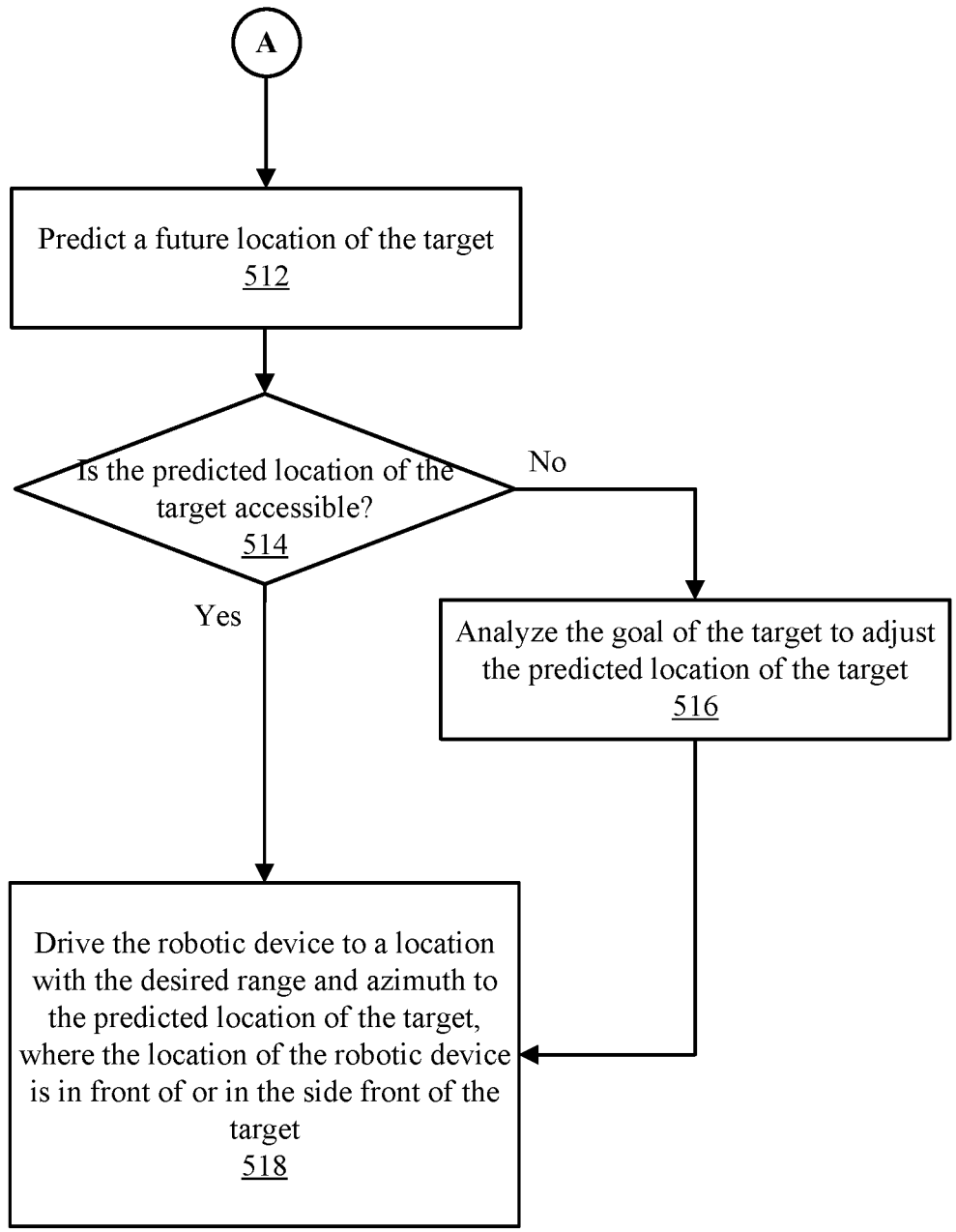

FIGS. 5A-5B illustrate a flowchart of another exemplary method 500 for autonomous target following, according to various embodiments of the present disclosure. The method 500 may be implemented in various environments including, for example, the system 100 of FIG. 1. The exemplary method 500 may be implemented by one or more components of the system 100 (e.g., the robotic device 104). The exemplary method 500 may be implemented by multiple systems similar to the system 100. The operations of method 500 presented below are intended to be illustrative. Depending on the implementation, the exemplary method 500 may include additional, fewer, or alternative steps performed in various orders or in parallel.

Referring to FIG. 5A, similar to the steps in FIG. 4A, at block 502, environmental measurements may be collected from sensors 124 equipped on the robotic device 104. At block 504, the environmental measurements may be clustered into multiple segments. At block 506, features of each segment clustered at block 504 may be extracted. At block 508, candidate segments may be selected among all segments clustered at block 504 by comparing the features of the segments extracted at block 506 with the target's features obtained during initialization of the robotic device 104. At block 510, the target's location at current time may be determined by filtering the candidate segments based on historical locations of the target stored at previous time points.

Referring to FIG. 5B, at block 512, a future location of the target may be predicted. At block 514, it may be determined whether the predicted location of the target is accessible. For example, it may be determined whether the predicted location of the target is inside a locked room, onto a house pillar, within a blocked area, etc. If it is determined that the predicted location of the target is not accessible, at block 516, the goal of the target may be analyzed to adjust the predicted location of the target to an accessible location. Then, at block 518, the robotic device 104 may be driven to a location with the desired range and azimuth to the predicted location of the target, where the location of the robotic device is in front of or in the side front of the target. If it is determined that the predicted location of the target is accessible at block 514, then the method 500 processes to block 518 directly.

Figure 6:
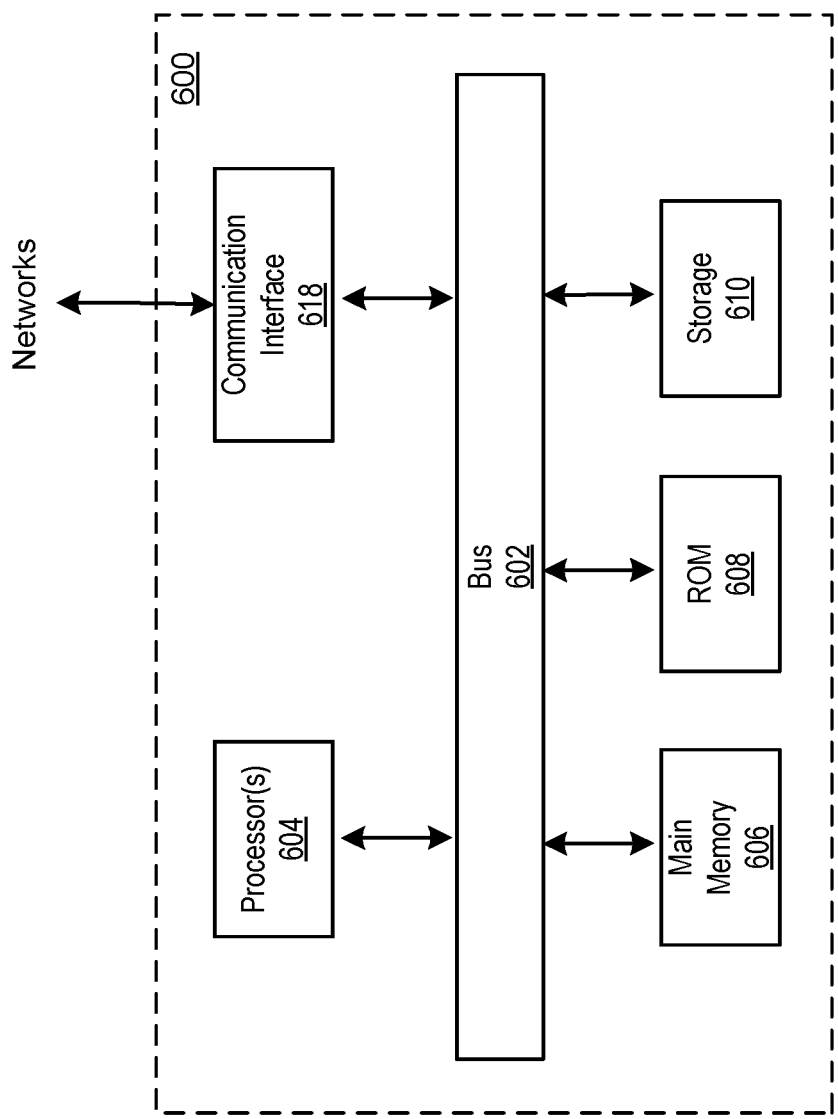
FIG. 6 illustrates a block diagram of an exemplary computer system in which any of the embodiments described herein may be implemented.

FIG. 6 is a block diagram that illustrates an exemplary computer system 600 in which any of the embodiments described herein may be implemented. The system 600 may correspond to the computing device 122 or the server 102 described above. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The main memory 606, the ROM 608, and/or the storage 610 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method for autonomous target following, implementable by a computing device on or communicatively connected to a robotic device, the robotic device moving within a distance from a target, the method comprising:

receiving environmental measurements collected by one or more sensors equipped on the robotic device, the environmental measurements including two dimensional (2D) or three dimensional (3D) laser scan data, a 2D or 3D laser point cloud, a color image, or a depth image;

clustering the environmental measurements into a plurality of object segments corresponding to a plurality of partial or entire objects based on distance discontinuity, color, or texture of points or pixels in the environmental measurements or by using machine learning and deep learning algorithms; and determining a current location of the target at a current time instant based on the plurality of object segments by:

extracting one or more features of each of the plurality of object segments;

capturing one or more initial target segments corresponding to a part of the target or the entire target at an initial time instant;

obtaining one or more features of the target and an initial location of the target in a local coordinate frame of the robotic device based on the one or more initial target segments corresponding to the part of the target or the entire target at the initial time instant, wherein the local coordinate frame of the robotic device having an origin moving with the robotic device;

comparing the extracted features of the plurality of object segments with the one or more features of the target obtained at the initial time instant to select one or more candidate segments from the plurality of object segments;

generating a predicted location of the target in the local coordinate frame of the robotic device at the current time instant by deriving a motion model of the target in the local coordinate frame of the robotic device from constant velocity model, constant speed and constant turn rate model, constant acceleration model, and constant acceleration and constant turn rate model of target;

selecting one or more segments consistent with the predicted location from the one or more candidate segments; and determining the current location of the target at the current time instant in the local coordinate frame of the robotic device based on the one or more selected segments; and controlling the robotic device to move within the distance from the target based on the determined current location of the target.

2. The method of claim 1, wherein one or more of the plurality of object segments correspond to a part of the target or the entire target.

3. The method of claim 1, further comprises:
filtering out one or more incompatible segments from the plurality of object segments based on the one or more features of each of the plurality of object segments.

4. The method of claim 1, wherein the one or more features of the each of the one or more object segments include one or more of a length, a width, convex property, a mean curvature and the radius of a curve included in the one or more object segments.

5. The method of claim 1, further comprising:
obtaining a region of interest about the location of the target by using a RF-based method; and
wherein comparing the extracted features of the plurality of object segments with the one or more features of the target obtained at the initial time instance to select one or more candidate segments from the plurality of object segments comprises: selecting the one or more candidate segments from the plurality of object segments based on the region of interest.

6. The method of claim 1, wherein determining a location of the target based on the plurality of object segments further comprises:
generating the predicted location of the target at a current time instant based on one or more historical locations of the target at one or more previous time instants; and
filtering out one or more segments incompatible with the predicted location of the target from the plurality of object segments to determine the location of the target at the current time instance.

7. The method of claim 6, wherein generating the predicted location of the target at a current time instant comprises:
fitting the one or more historical locations of the target into a polynomial to generate the predicted location.

8. The method of claim 6, wherein generating the predicted location of the target at a current time instant comprises:
generating the predicted location of the target based on an estimated polynomial;
selecting one or more segments compatible with the predicted location of the target from the plurality of object segments; and
updating one or more parameters of the polynomial based on a location determined by the one or more selected segments and historical locations of the target.

9. The method of claim 1, wherein the robotic device is moving in front of or in side front of the target, and wherein the method further comprises:
predicting a future location of the target at a future time instant based on the location of the target at a current time instant and one or more historical locations of the target at one or more previous time instants.

10. The method of claim 9, further comprising:
determining whether the future location of the target is accessible;
in response to determining that the future location of the target is not accessible, analyze an intent of the target to adjust the future location of the target; and
in response to determining that the future location of the target is accessible, drive the robotic device to a location with a desired range and azimuth to the future location of the target.

11. The method of claim 1, further comprises:
generating a machine learning model for detecting a part of the target or the entire target based on the one or more features of each of the plurality of object segments; and
training the machine learning model by using training data which comprises a plurality of target segments corresponding to a part of the target or the entire target collected offline.

12. The method of claim 1, further comprising:
storing a plurality of historical locations of the robotic device;
forming a path based on the plurality of historical locations;
determining one or more turning points on the path based on one or more changes of directions;
generating a graph by using the one or more turning points, one of the plurality of historical locations and the current location as nodes; and
optimizing the path to determine an optimal route between the one of the plurality of historical locations and the current location based on the graph;
driving the robotic device to move from the current location back to the one of the plurality of historical locations by the optimal route to guide the target to move from the current location back to the one of the plurality of historical locations.

13. A system for autonomous target following, deployed on or communicatively connected to a robotic device, the robotic device moving within a distance from a target, the system comprising:
a processor; and
a non-transitory computer-readable storage medium storing instructions that, when executed by the processor, cause the system to perform a method for autonomous target following, the method comprising:
receiving environmental measurements collected by one or more sensors equipped on the robotic device, the environmental measurements including two dimensional (2D) or three dimensional (3D) laser scan data, a 2D or 3D laser point cloud, a color image, or a depth image;
clustering the environmental measurements into a plurality of object segments corresponding to a plurality of partial or entire objects based on distance discontinuity, color, or texture of points or pixels in the environmental measurements or by using machine learning and deep learning algorithms; and
determining a current location of the target at a current time instant based on the plurality of object segments by:
extracting one or more features of each of the plurality of object segments;
capturing one or more initial target segments corresponding to a part of the target or the entire target at an initial time instant;
obtaining one or more features of the target and an initial location of the target in a local coordinate frame of the robotic device based on the one or more initial target segments corresponding to the part of the target or the entire target at the initial time instant, wherein the local coordinate frame of the robotic device having an origin moving with the robotic device;
comparing the extracted features of the plurality of object segments with the one or more features of the target obtained at the initial time instant to select one or more candidate segments from the plurality of object segments;
generating a predicted location of the target in the local coordinate frame of the robotic device at the current time instant by deriving a motion model of the target in the local coordinate frame of the robotic device from constant velocity model, constant speed and constant turn rate model, constant acceleration model, and constant acceleration and constant turn rate model of target;
selecting one or more segments consistent with the predicted location from the one or more candidate segments; and
determining the current location of the target at the current time instant in the local coordinate frame of the robotic device based on the one or more selected segments; and
controlling the robotic device to move within the distance from the target based on the determined current location of the target.

14. The system of claim 13, wherein one or more of the plurality of object segments correspond to a part of the target or the entire target.

15. The system of claim 13, wherein the method further comprises:
filtering out one or more incompatible segments from the plurality of object segments based on the one or more features of each of the plurality of object segments.

16. A robotic device, comprising: one or more sensors equipped on the robotic device; and a computing device deployed on the robotic device, the computing device comprising:
a processor; and
a non-transitory computer-readable storage medium storing instructions that, when executed by the processor, cause the computing device to perform a method for autonomous target following, the method comprising:
receiving environmental measurements collected by one or more sensors equipped on the robotic device, the environmental measurements including two dimensional (2D) or three dimensional (3D) laser scan data, a 2D or 3D laser point cloud, a color image, or a depth image;
clustering the environmental measurements into a plurality of object segments corresponding to a plurality of partial or entire objects based on distance discontinuity, color, or texture of points or pixels in the environmental measurements or by using machine learning and deep learning algorithms; and
determining a current location of the target at a current time instant based on the plurality of object segments by:
extracting one or more features of each of the plurality of object segments;
capturing one or more initial target segments corresponding to a part of the target or the entire target at an initial time instant;
obtaining one or more features of the target and an initial location of the target in a local coordinate frame of the robotic device based on the one or more initial target segments corresponding to the part of the target or the entire target at the initial time instant, wherein the local coordinate frame of the robotic device having an origin moving with the robotic device;
comparing the extracted features of the plurality of object segments with the one or more features of the target obtained at the initial time instant to select one or more candidate segments from the plurality of object segments;
generating a predicted location of the target in the local coordinate frame of the robotic device at the current time instant by deriving a motion model of the target in the local coordinate frame of the robotic device from constant velocity model, constant speed and constant turn rate model, constant acceleration model, and constant acceleration and constant turn rate model of target;
selecting one or more segments consistent with the predicted location from the one or more candidate segments; and
determining the current location of the target at the current time instant in the local coordinate frame of the robotic device based on the one or more selected segments; and
controlling the robotic device to move within the distance from the target based on the determined current location of the target.

17. The method of claim 1, wherein the predicted location of the target is represented in polar coordinates in the local coordinate frame of the robotic device and the determined current location of the target is represented in polar coordinates in the local coordinate frame of the robotic device.

\* \* \* \* \*